United States Patent
Toba

(12)
(10) Patent No.: US 6,529,747 B1
(45) Date of Patent: Mar. 4, 2003

(54) OPEN/CLOSE-TYPE PORTABLE TELEPHONE

(75) Inventor: Hiroyuki Toba, Saitama (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/511,904

(22) Filed: Feb. 23, 2000

(30) Foreign Application Priority Data

Feb. 23, 1999 (JP) .......................................... 11-045018

(51) Int. Cl.$^7$ ................................................ H04B 1/38
(52) U.S. Cl. ...................... 455/563; 455/565; 455/575
(58) Field of Search ................................ 455/563, 564, 455/566, 567, 569, 90, 575, 414, 95, 565

(56) References Cited

U.S. PATENT DOCUMENTS

| | | | | |
|---|---|---|---|---|
| 4,426,733 A | * | 1/1984 | Brenig ........................ 455/221 |
| 4,737,976 A | * | 4/1988 | Borth et al. .................... 379/58 |
| 4,945,570 A | * | 7/1990 | Gerson et al. .................. 379/58 |
| 4,998,291 A | * | 3/1991 | Marui et al. .................... 455/89 |
| 5,042,063 A | * | 8/1991 | Sakanishi et al. ............... 379/88 |
| 5,054,053 A | * | 10/1991 | Sakanishi et al. ............... 379/63 |
| 5,353,376 A | * | 10/1994 | Oh et al. ........................ 381/41 |
| 5,402,481 A | * | 3/1995 | Waldman ..................... 379/355 |
| 6,061,654 A | * | 5/2000 | Brown et al. ................. 455/563 |
| 6,167,251 A | * | 12/2000 | Segal et al. .................. 455/406 |
| 6,449,496 B1 | * | 9/2002 | Beith et al. .................. 455/563 |

FOREIGN PATENT DOCUMENTS

| | | |
|---|---|---|
| JP | 4-259156 | 9/1992 |
| JP | 5-316193 | 11/1993 |
| JP | 6-209358 | 7/1994 |
| JP | 2531436 | 6/1996 |
| JP | 10-224488 | 8/1998 |
| JP | 10-290286 | 10/1998 |
| JP | 10-308818 | 11/1998 |
| JP | 11-3249 | 1/1999 |
| JP | 11-74953 | 3/1999 |

* cited by examiner

*Primary Examiner*—Thanh Cong Le
*Assistant Examiner*—Thuan T. Nguyen
(74) *Attorney, Agent, or Firm*—Sughrue Mion, PLLC

(57) ABSTRACT

An open/close-type telephone with a speech recognizer allowing ease of use and security to be improved is disclosed. The speech recognizer is activated when the telephone is opened and, when predetermined speech is inputted the dialing-inhibition state is canceled to allow dialing.

18 Claims, 4 Drawing Sheets

OPEN/CLOSE-TYPE PORTABLE TELEPHONE

BACKGROUND OF THE INVENTION

1. Field of the Invention

The present invention generally relates to an open/close-type portable telephone, and in particular to the portable telephone having a speech recognition function.

2. Description of the Related Art

An increasing number of portable telephones with speech recognition function have been used in digital cellular telecommunication systems such as PDC (Personal Digital Cellular or digital cordless telephone systems such as PHS (Personal Handy-phone System).

For example, there has been proposed a portable telephone with enhanced security such that the dialing inhibition state thereof is canceled by recognizing predetermined input voice (see. Japanese Patent Unexamined Publication No. 10-290286).

According to another portable telephone, by using the speech recognition function to input the name of a person who is to be called, the telephone number thereof is automatically read out and displayed on its display (see Japanese Patent Unexamined Publication No. 5-316193).

In general, such a voice-activated portable telephone has a speech recognition function which is activated by operating a speech recognition key provided on the major surface or the side surface of its housing.

On the other hand, a portable telephone generally has three types: straight-type; flip-type; and foldable-type. A straight-type telephone has a keypad, a speaker, and a microphone provided on the major surface thereof without a lid. A flip-type telephone has a lid with which a keypad, a speaker, and a microphone on the major surface thereof are covered. Therefore, when an incoming call occurs or making a call, the lid is opened by the user. A foldable-type telephone is composed of two housing parts which are foldable as necessary. When making a call, the user opens the housing parts to use it like a straight-type telephone. In such a flip-type or foldable-type portable telephone, a speech recognition key is provided on the major surface which is covered with the lid or the other housing when unused. Therefore, when activating the speech recognition function, the user must open the lid or the housings to operate the speech recognition key, resulting in some inconvenience.

There has been proposed a hands-free portable telephone having a speech recognition function in Japanese Patent Unexamined Publication No. 10-308818. This hands-free portable telephone uses the speech recognition function to allow complete hands-free operations such as dialing inhibition cancellation and dialing.

A conventional foldable portable telephone having an open/close detector has been disclosed (Japanese Patent No. 2531436). In this portable telephone, when the housings are opened, a predetermined telephone number is automatically dialed.

However, the above-described prior arts have the following disadvantages. In an open/close-type portable telephone such as foldable-type or flip-type one, when activating the speech recognition function, the user must open the lid or the housings to operate the speech recognition key, resulting in inconvenience.

Further, the hands-free portable telephone disclosed in Japanese Patent Unexamined Publication No. 10-308818 does not relate directly to an open/close-type portable telephone. Therefore, the above-mentioned disadvantage caused by the open/close-type portable telephone are not considered.

The conventional foldable portable telephone disclosed in Japanese Patent No. 2531436, when opened, automatically dials a predetermined telephone number. Therefore, there is a possibility that an unauthorized person makes a call by opening the housings and at this time knows the predetermined telephone number, resulting in reduced security.

SUMMARY OF THE INVENTION

An object of the present invention is to provide an open/close-type portable telephone and a control method therefor allowing easy operation and enhanced security thereof.

According to the present invention, an open/close-type portable telephone includes a wireless telephone circuit, a speech input/output circuit, a speech recognizer for recognizing input speech inputted by the speech input/output circuit, a detector for detecting an open/close state of the portable telephone, and a controller for activating the speech recognizer when the detector detects that the portable telephone is in an open state.

After activating the speech recognizer, preferably, the controller cancels a dialing-inhibition state when the input speech is recognized as predetermined speech by the speech recognizer.

When the input speech is recognized as a predetermined speech corresponding to a predetermined phone number by the speech recognizer after activating the speech recognizer, the controller further controls the wireless telephone circuit to make a call at the predetermined phone number. The controller may cancel a dialing-inhibition state before controlling the wireless telephone circuit to dial the predetermined phone number.

The open/close-type portable telephone may include an input device, a display, and a memory for storing a plurality of phone numbers including a predetermined phone number. When the input speech is recognized as a predetermined speech corresponding to the predetermined phone number by the speech recognizer after activating the speech recognizer, the controller further controls the display to display the predetermined phone number thereon and, after a lapse of a predetermined time period, controls the wireless telephone circuit to dial the predetermined phone number. Further, the telephone is provided with a timer set for the predetermined time period through the Input device.

The open/close-type portable telephone may include a memory for storing a plurality of phone numbers including a plurality of predetermined phone numbers. When the input speech is recognized as a predetermined speech corresponding to the plurality of predetermined phone numbers by the speech recognizer after activating the speech recognizer, the controller further controls the display to display the predetermined phone numbers thereon and, after a lapse of a predetermined time period, controls the wireless telephone circuit to dial a selected one of the predetermined phone numbers displayed. The selected one of the predetermined phone numbers displayed may be selected by speech input through the speech recognizer.

At least a part of the predetermined phone number is preferably masked with a predetermined symbol.

DETAILED DESCRIPTION OF THE PREFERRED EMBODIMENT

Hereafter, an open/close-type portable telephone according to an embodiment of the present invention will be described in detail. In this embodiment, a foldable-type portable telephone is taken as an example. Needless to say, the present invention is applicable to a flip-type portable telephone It should be noted that the term "open/close-type" includes both "foldable-type" and "flip-type". Further, although a PDC terminal is taken as an example in this embodiment, the present invention is also applicable to another digital cellular telephone or a digital cordless telephone such as PHS.

Figure 1:
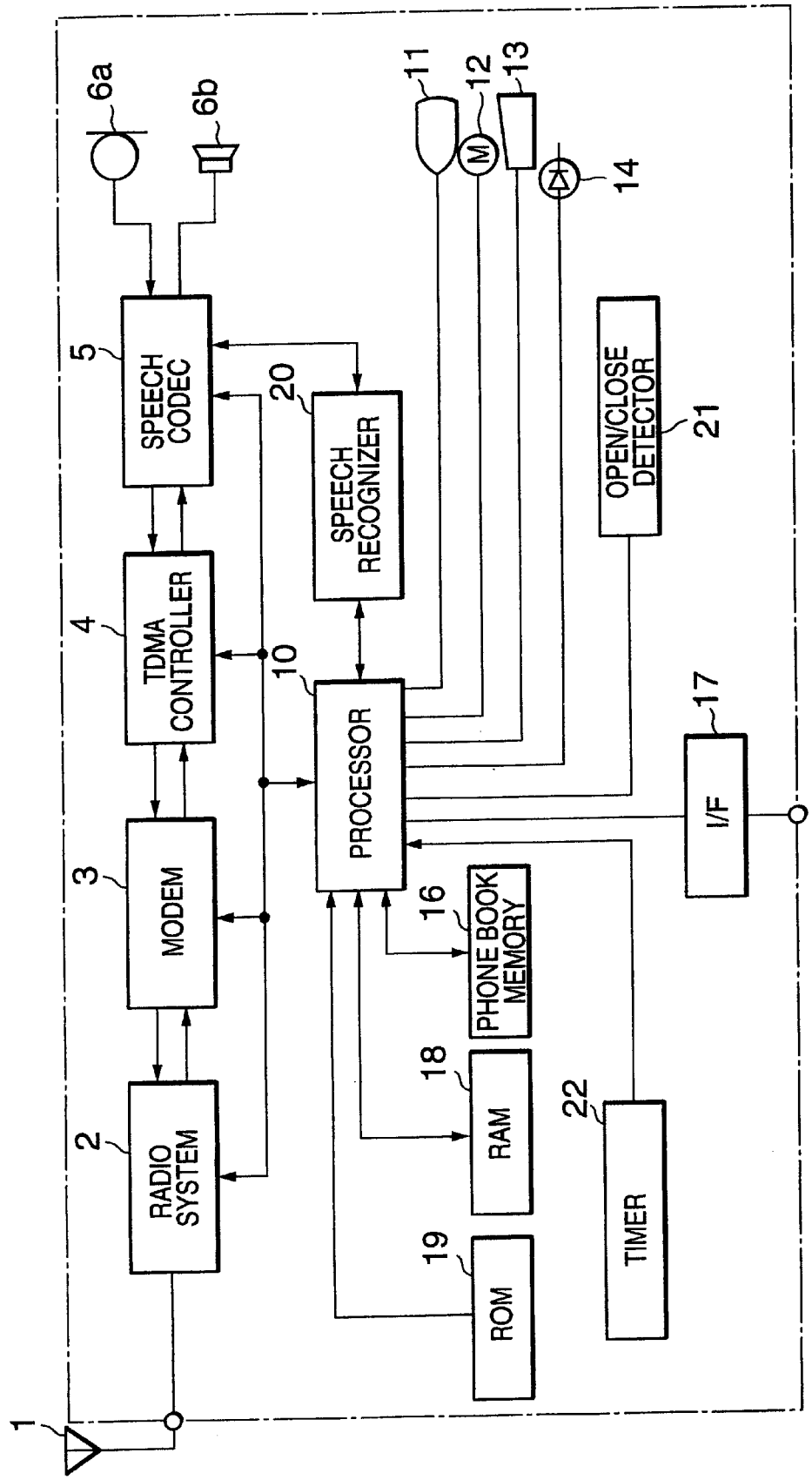
FIG. 1 is a block diagram showing an open/close-type portable telephone according to an embodiment of the present invention.

Referring to FIG. 1, a PDC terminal according to the embodiment of the present invention includes an antenna 1, a radio system 2, a modulator/demodulator (modem) 3, a TOMA (time division multiple access) controller 4, and a speech encoder/decoder (codec) 5. The speech codec 5 encodes a transmission voice signal received from a microphone 6a and decodes a reception signal received from the TDMA controller 4 to produce a reception voice signal which is outputted to a speaker 6b.

The radio system 2 includes a high-speed frequency switching synthesizer (not shown) such as a digital loop-preset synthesizer (DLPS), which supplies a designated local frequency to transmission and reception frequency converters to receive a desired frequency channel. Further, the radio system 2 includes a received signal strength detector (not shown) which detects a received signal electric field strength by envelope-detecting an intermediate received signal produced by mixing a radio-frequency received signal with the designated local frequency signal.

The modem 3 operates according to quadrature modulation scheme such as QPSK. The modem 3 modulates a carrier according to transmission data received from the TDMA controller 4 and demodulates a intermediate-frequency received signal received from the radio system 2 to produce receive data and output it to the TDMA controller 4. The TDMA controller 4 performs TDMA channel encoding/decoding.

A processor 10 which is a program-controlled processor such as a microprocessor controls the operations of the PDC terminal. The processor 10 is connected to the radio system 2, the modem 3, the TDMA controller 4, and the speech codec 5 to control the PDC telephone operations. The processor 10 is further connected to a display 11, a vibrator 12, a keypad 13, and a light-emitting diode (LED) 14. The display 11 may be a liquid-crystal display and displays necessary information including received signal strength and the telephone number of a calling or called party. The vibrator 12 is used to inform the user by silent vibrations of occurrence of an incoming call. Similarly, the LED 14 is used to inform the user by light blinking of occurrence of an call. The keypad 13 is used to input data or instructions including power-on/off, on-hook/off-hook, function selection and dialing number.

Further, the processor 10 is connected to a phonebook memory 16, an interface 17, a random access memory (RAM) 18, and a read-only memory (ROM) 19. The interface 17 Is used to connect the PDC terminal to an external data terminal. The RAM 18 is used for working. The ROM 19 previously stores a boot program and control programs which run on the processor 10 to perform various control operations.

The PDC terminal is further provided with a speech recognizer 20 which operates according to a well-known speech recognition scheme such as linear predictive coding, PARCOR, or Dynamic Programming. Further the speech recognizer 20 stores predetermined voice data which was previously inputted by an permitted user of the PDC terminal through the microphone 61a and the speech codec 5. In this embodiment, the speech recognizer 20 stores the predetermined voice data "Dial a predetermined phone number". As described later, the speech recognizer 20 is started up by the processor 10 when the PDC terminal is opened. To detect an open/close state, the PDC terminal is provided with an open/close detector 21 which may be an optical or mechanical switch. A timer 22 for counting a predetermined time period outputs an interrupt signal to the processor 10 when the predetermined time period has elapsed.

Figure 2:
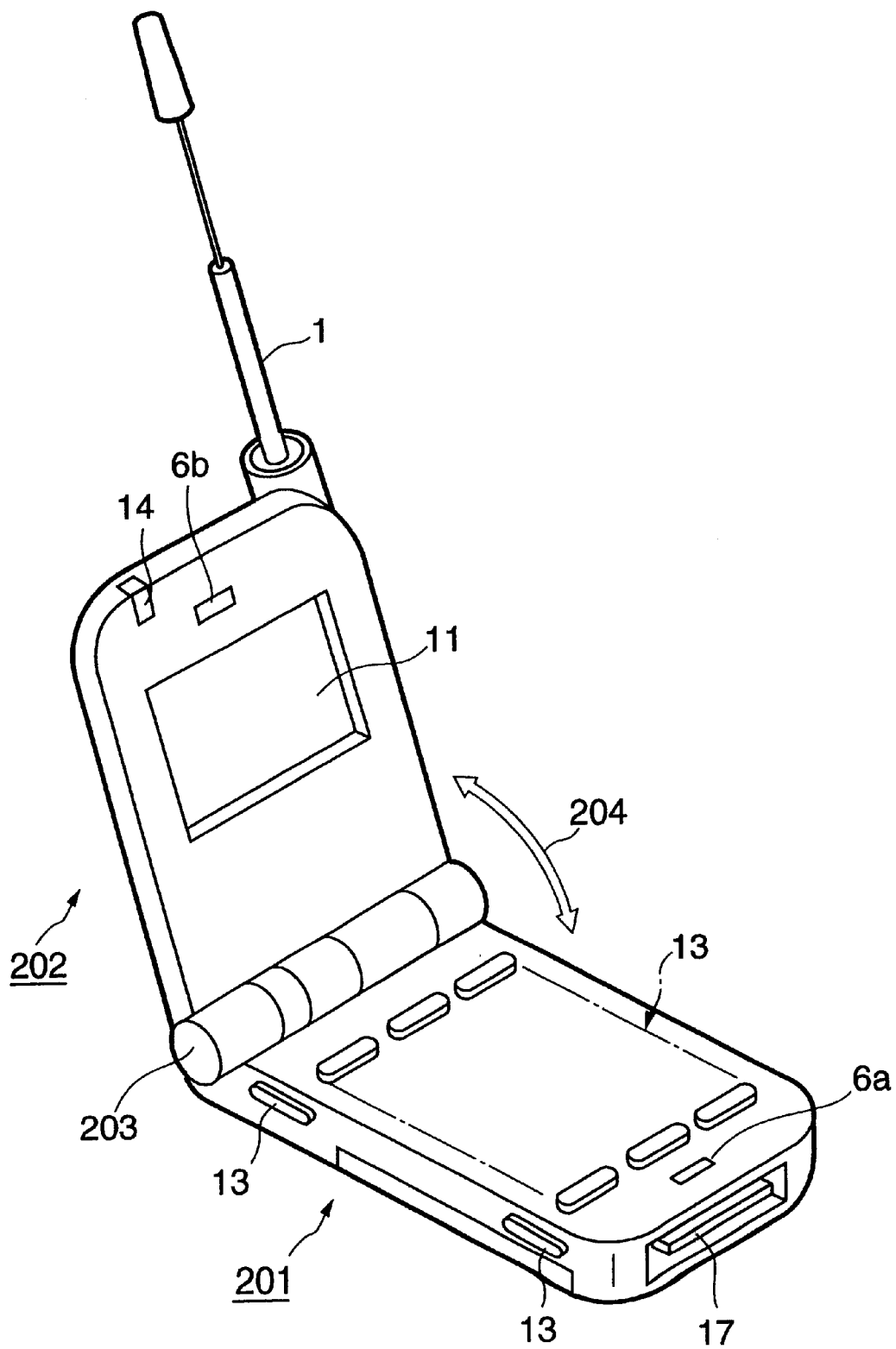
FIG. 2 is a perspective view of the open/close-type portable telephone according to the embodiment of the present invention.

Referring to FIG. 2, the foldable-type PDC terminal is composed of a first housing 201 and a second housing 202 which are rotatably connected to each other by a hinge 203. Therefore, the first and second housing 201 and 202 are allowed to be opened and closed in the direction indicated by an arrow 204. The first housing 201 is provided with the microphone 6a, the keypad 13, and a connector of the interface 17. The second housing 202 is provided with the antenna 1, the speaker 6b, a display 11, and the LED 14. The open/close detector 21 is provided at an appropriate position in the hinge 203 or in the housing 201 so that its switch state changes depending on an open/close state of the first and second housings 201 and 202.

The PDC terminal operates according to the RCD-STD-27F/G standards. For example, when a PDC terminal moves into the cell of a cell station, the PDC terminal receives location information from the cell station through the BCCH (Broadcasting Control Channel) and performs new location registration according to the location registration sequence. After the location registration, a TCH(Traffic Channel) request and link establishment sequence is performed between the PDC terminal and the cell station through CCCH (Common Control Channel)—PCH (Paging Channel)/SCCH (Signaling Control Channel). The TCH is used for occurrence of incoming call, calling, location registration, acknowledgement, and the like. Further, necessary information such as dialing number and function selection information voice data and communication data are transmitted through a communication channel "TCH-FACCH (Fast Associated Control Channel)/SACCH (Slow ACCH)".

When the PDC terminal moves into another cell, the PDC terminal detects a reduction in received signal strength. When detecting a reduction in received signal strength, the ODC terminal performs the mobile assisted hand-over sequence to continue the communication while moving from one cell to another cell.

In the case where the user opens the PDC terminal and operates the keypad 13 to input a destination phone number with off-hook, the processor 10 instructs the TDMA controller 4 to transmit a call request signal carrying the destination phone number (destination address) to the cell station. When receiving the call request from the PDC terminal through the cell station, a mobile communication control station (MCC) accommodating a plurality of cell stations searches a database (subscriber file) and allocates a time slot (communication channel) of a TDMA frame to the PDC terminal. There is also another network configuration where a cell station allocates the time slot to the PDC terminal.

OPERATION

Figure 3:
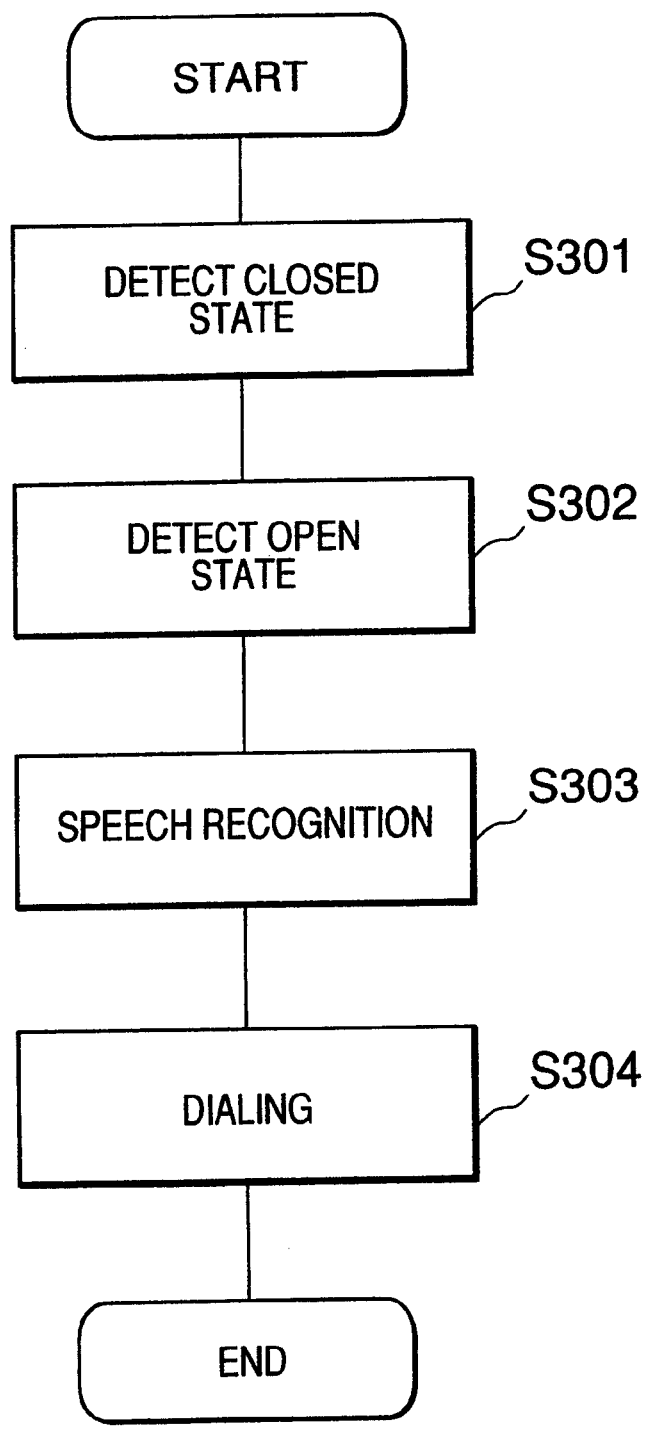
FIG. 3 is a flowchart showing a schematic control flow of the open/close-type portable telephone according to the embodiment.

Referring to FIG. 3, when the PDC terminal is closed, the open/close detector 21 is in off state (step S301). When it is opened, the open/close detector 21 outputs an interrupt signal to the processor 10 (step S302). When receiving the interrupt signal from the open/close detector 21, the processor 10 activates the speech recognizer 20. When voice input is made, the speech recognizer 20 starts recognizing the inputted voice and the recognized voice data is outputted to the processor 10 (step S303). The processor 10 performs a control operation depending on the recognized voice data.

For example, in the case where the speech recognizer 20 previously stores the predetermined voice data "Dial a predetermined phone number", if it is determined that the same voice data is inputted by the same user, then the processor 10 searches the phonebook memory 16 for a phone number corresponding to the voice "the predetermined phone number" and displays the found phone number on the display 11 When an interrupt signal is received from the timer 22 without any instruction, the processor 10 automatically instructs the TDMA controller 4 to transmit the displayed phone number(step S304). The phone number corresponding to the predetermined voice "the predetermined phone number" is stored in advance in the phonebook memory 16 by the user operating the keypad 13. It is also possible to mark the predetermined phone number to be retrieved from the phonebook memory 16.

As another example, in the case where the speech recognizer 20 previously stores predetermined voice data of one or more person's name, if the same voice data is inputted, then the processor 10 searches the phonebook memory 16 for a phone number corresponding to the name and displays the found phone number on the display 11. After a lapse of the predetermined time period, dialing the found phone number is performed as described before.

As still another example, in the case where the speech recognizer 20 previously stores predetermined voice data corresponding to a plurality of predetermined phone numbers, if the predetermined voice data is inputted by the same user, then the processor 10 searches the phonebook memory 16 for the plurality of phone numbers corresponding to the predetermined voice data and displays the found phone numbers on the display 11. Thereafter, the user selects one of the displayed phone numbers by voice input. For example, voice data "Select number one and make a call" is inputted by the user. After a lapse of the predetermined time period, dialing the selected phone number is performed as described before.

As further another example, in the case where the PDC terminal has a function of inhibiting dialing and the PDC terminal is set to the dialing-inhibition state, the dialing-inhibition state may be canceled when the PDC terminal is opened and then inputted voice is recognized by the speech recognizer 20. When the speech recognizer 20 previously stores the predetermined voice data "Dial a predetermined phone number" and it is determined that the same voice data Is inputted by the same user, then the processor 10 searches the phonebook memory 16 for a phone number corresponding to the inputted voice data and displays the found phone number on the display 11. After a lapse of the predetermined time period, dialing the found phone number is performed as described before.

In this case, the speech recognition when the PDC terminal is opened is the equivalent of canceling the dialing-inhibition state. Therefore, there is no need to input the predetermined voice for canceling the dialing-inhibition state. In the case where the predetermined voice for canceling the dialing-inhibition state is required, dialing by an unauthorized person can be prevented more completely.

Figure 4:
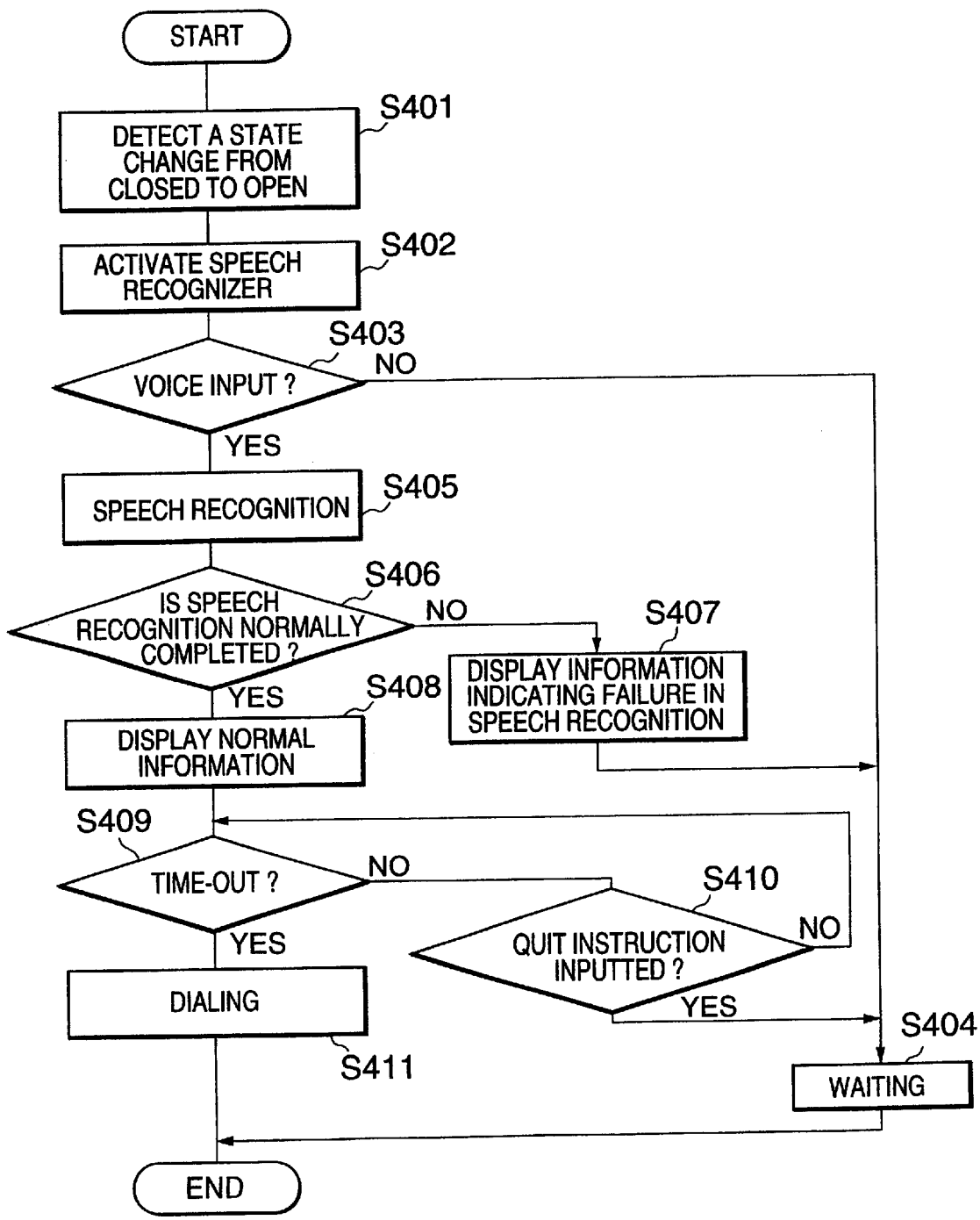
FIG. 4 is a flowchart showing a detailed control flow of the open/close-type portable telephone according to the embodiment.

Referring to FIG. 4, when the foldable-type PDC terminal is opened, the open/close detector 21 changes from off state to on state to output an interrupt signal to the processor 10 (step S401) When receiving the interrupt signal from the open/close detector 21, the processor 10 activates the speech recognizer 20 (step S402). After opening the PDC terminal, the user inputs an instruction by voice through the microphone 6a. When receiving the voice data from the speech recognizer 20, the processor 10 determines that voice has been inputted (YES in step S403). When no voice is inputted (NO in step S403), the processor 10 shifts its operation mode into a reception waiting mode (step S404).

When it is determined that voice has been inputted (YES in step S403), the processor 10 starts the speech recognizer 20 recognizing the encoded voice data received from the speech codec 5 according to the above-mentioned speech recognition scheme (step S405). In this embodiment, since the speech recognizer 20 previously stores the predetermined voice data "Dial a predetermined phone number" inputted by the permitted user, the speech recognizer 20 determines whether the same voice data is inputted by the permitted user through the microphone 6a. If it is determined that the same voice data is inputted by the permitted user, then the speech recognizer 20 informs the processor 10 of success in speech recognition. If It is not determined that the same voice data is inputted by the permitted user, the speech recognizer 20 informs the processor 10 of failure in speech recognition. The processor 10 determines the success or failure in speech recognition from information received from the speech recognizer 20 (step S406). When the speech recognition ended in failure (NO in step S406), the processor 10 controls the speech codec 5 and the display 11 so that the information indicating the failure in speech recognition is outputted through the speaker by voice and Is also displayed on the display 11 (step S407). Thereafter, the control goes to the step S404.

When the speech recognition has been successfully completed (YES in step S406), the processor 10 searches the phonebook memory 16 for the predetermined phone number. Preferably, the processor 10 cancels the dialing inhibition mode when the speech recognition has been successfully completed. Since the predetermined phone number is stored and marked in the phonebook memory 16, the predetermined phone number is found. Therefore, the processor 10 controls the speech codec 5 and the display 11 so that the information indicating the success in speech recognition is outputted through the speaker by voice and the predetermined phone number is also displayed on the display 11 (step S408). Alternatively, it is preferable that the predetermined phone number is not displayed on the display 11 or is masked with specific marks other than numerals so as not to be seen by other persons.

After displaying the normally completed result on the display 11 (step S408), the processor 10 starts the timer 22 which is set for a predetermined time period (here, n seconds). This predetermined time period (n seconds) can be set to a desired time period so that the user can easily check the destination phone number. Therefore, the processor 10 waits n seconds unless a quit instruction is received (steps S409 and S410). If the quit instruction is received within the predetermined time period of n seconds (YES in step S410), then the control goes to the step S404.

After a lapse of n seconds (YES in step S409), the processor 10 controls the TDMA controller 4 to dial the predetermined phone number (step S411).

The timer 22 can be set for a desired time period (n seconds) by the user operating the keypad 13 depending on how to use or where used, for example, when moving with difficulty in seeing the displayed phone number on screen. Therefore, the user can easily check the displayed phone number.

In the above embodiment, a PDC terminal of TDMA system is described. Needless to say, the present invention is also applicable to a PHS terminal of TDMA/TDD system (RCD-STD-28 standards), wherein the TDMA controller 4 is replaced with a TDMA/TDD controller. Further, the present invention is also applicable to a CDMA terminal (IS-95 standards) or a W-CDMA terminal.

As described above, the speech recognizer is activated when the open/close-type telephone terminal is opened and, when predetermined speech is inputted, the dialing-inhibition state is canceled to allow dialing. Therefore, the speech recognizer is activated without the need to operating a special key, resulting in enhanced ease of use and operation and further improved security.

In the case where a predetermined phone number displayed on the display is at least partly masked with a special symbol other than numerals. Therefore, the predetermined phone number can be prevented from being seen by other persons, resulting in enhanced security.

Dialing is made after a lapse of a predetermined time period which can be set to a desired time period (n seconds) by the user operating the keypad 13 depending on how to use or where used, for example, when moving with difficulty in seeing the displayed phone number on screen. Therefore, the user can easily check the displayed phone number.

What is claimed is:

1. An open/close-type portable telephone comprising:
    a wireless telephone circuit;
    a speech input/output circuit;
    a speech recognizer for recognizing input speech inputted by the speech input/output circuit;
    a detector for detecting an open/close state of the telephone: and
    a controller for activating the speech recognizer when the detector detects that the portable telephone is in an open state,
    wherein, after activating the speech recognizer, the controller further cancels a dialing, inhibition state when the input speech is recognized as predetermined speech by the speech recognizer.

2. The open/close-type portable telephone according to claim 1, wherein, when the input speech is recognized as a predetermined speech corresponding to a predetermined phone number by the speech recognizer after activating the speech recognizer, the controller further controls the wireless telephone circuit to dial the predetermined phone number.

3. The open/close-type portable telephone according to claim 1, wherein, when the input speech is recognized as a predetermined speech corresponding to a predetermined phone number by the speech recognizer after activating the speech recognizer, the controller further cancels a dialing-inhibition state before controlling the wireless telephone circuit to dial the predetermined phone number.

4. The open/close-type portable telephone according to claim 1, further comprising:
    an input device;
    a display; and
    a memory for storing a plurality of phone numbers including a predetermined phone number,
    wherein, when the input speech is recognized as a predetermined speech corresponding to the predetermined phone number by the speech recognizer after activating the speech recognizer, the controller further controls the display to display the predetermined phone number thereon and, after a lapse of a predetermined time period, controls the wireless telephone circuit to dial the predetermined phone number.

5. The open/close-type portable telephone according to claim 4, wherein a timer is set for the predetermined time period through the input device.

6. The open/close-type portable telephone according to claim 1, further comprising:
    a display; and
    a memory for storing a plurality of phone numbers including a plurality of predetermined phone numbers,
    wherein, when the input speech is recognized as a predetermined speech corresponding to the plurality of predetermined phone numbers by the speech recognizer after activating the speech recognizer, the controller further controls the display to display the predetermined phone numbers thereon and, after a lapse of a predetermined time period, controls the wireless telephone circuit to dial a selected one of the predetermined phone numbers displayed.

7. The open/close-type portable telephone according to claim 6, wherein the selected one of the predetermined phone numbers displayed is selected by speech input through the speech recognizer.

8. The open/close-type portable telephone according to claim 4, wherein at least a part of the predetermined phone number is masked with a predetermined symbol.

9. The open/close-type portable telephone according to claim 6, wherein at least a part of each of the predetermined phone numbers is masked with a predetermined symbol.

10. The open/close-type portable telephone according to claim 1, further comprising a first housing and a second housing which are foldable.

11. The open/close-type portable telephone according to claim 1, further comprising a housing and a lid movably connected to the housing, wherein at least a part of a keypad of the housing is covered with the lid.

12. A control method for an open/close-type portable telephone having a speech recognizer therein, comprising the steps of:
    detecting an open/close state of the portable telephone; and
    activating the speech recognizer when an open state of the open/close-type portable telephone is detected, further comprising the step of:
    canceling a dialing-inhibition state when input speech is recognized as predetermined speech by the speech recognizer.

13. The control method according to claim 12, further comprising the step of:

when the input speech is recognized as a predetermined speech corresponding to a predetermined phone number by the speech recognizer after activating the speech recognizer, making a call at the predetermined phone number.

14. The control method according to claim 12, further comprising the steps of:

when the input speech is recognized as a predetermined speech corresponding to a predetermined phone number by the speech recognizer after activating the speech recognizer, canceling the dialing-inhibition state; and dialing the predetermined phone number.

15. The control method according to claim 12, further comprising the steps of:

storing a plurality of phone numbers including a predetermined phone number;

when the input speech is recognized as a predetermined speech corresponding to the predetermined phone number by the speech recognizer after activating the speech recognizer, displaying the predetermined phone number; and after a lapse of a predetermined time period, dialing the predetermined phone number.

16. The control method according to claim 12, further comprising the steps of:

storing a plurality of phone numbers including a plurality of predetermined phone numbers;

when the input speech is recognized as a predetermined speech corresponding to the predetermined phone number by the speech recognizer after activating the speech recognizer, displaying the predetermined phone numbers;

selecting one of the predetermined phone numbers displayed; and dialing a selected predetermined phone number.

17. The control method according to claim 16, wherein the one of the predetermined phone numbers displayed is selected by speech input through the speech recognizer.

18. The open/close-type portable telephone according to claim 1, wherein the speech recognizer previously stores predetermined speech data which has been inputted by an authorized user, wherein the controller cancels a dialing-inhibition state when the input speech is recognized as the predetermined speech data by the speech recognizer.

* * * * *